Figure 1:
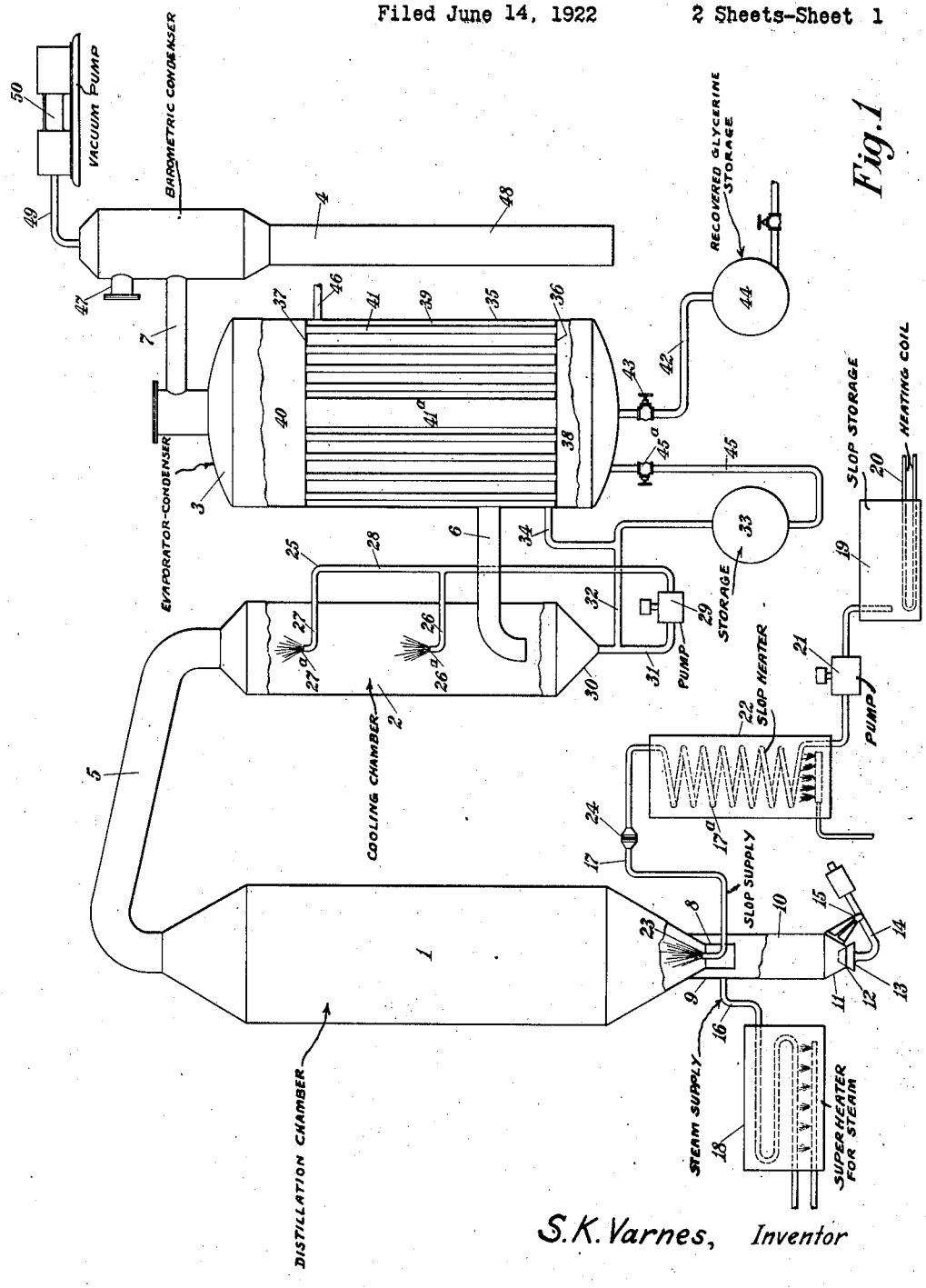

May 3, 1927.

S. K. VARNES 1,626,986

METHOD OF RECOVERING GLYCERINE FROM FERMENTED MOLASSES MASH

Filed June 14, 1922    2 Sheets-Sheet 1

S. K. Varnes, Inventor

By his attorney

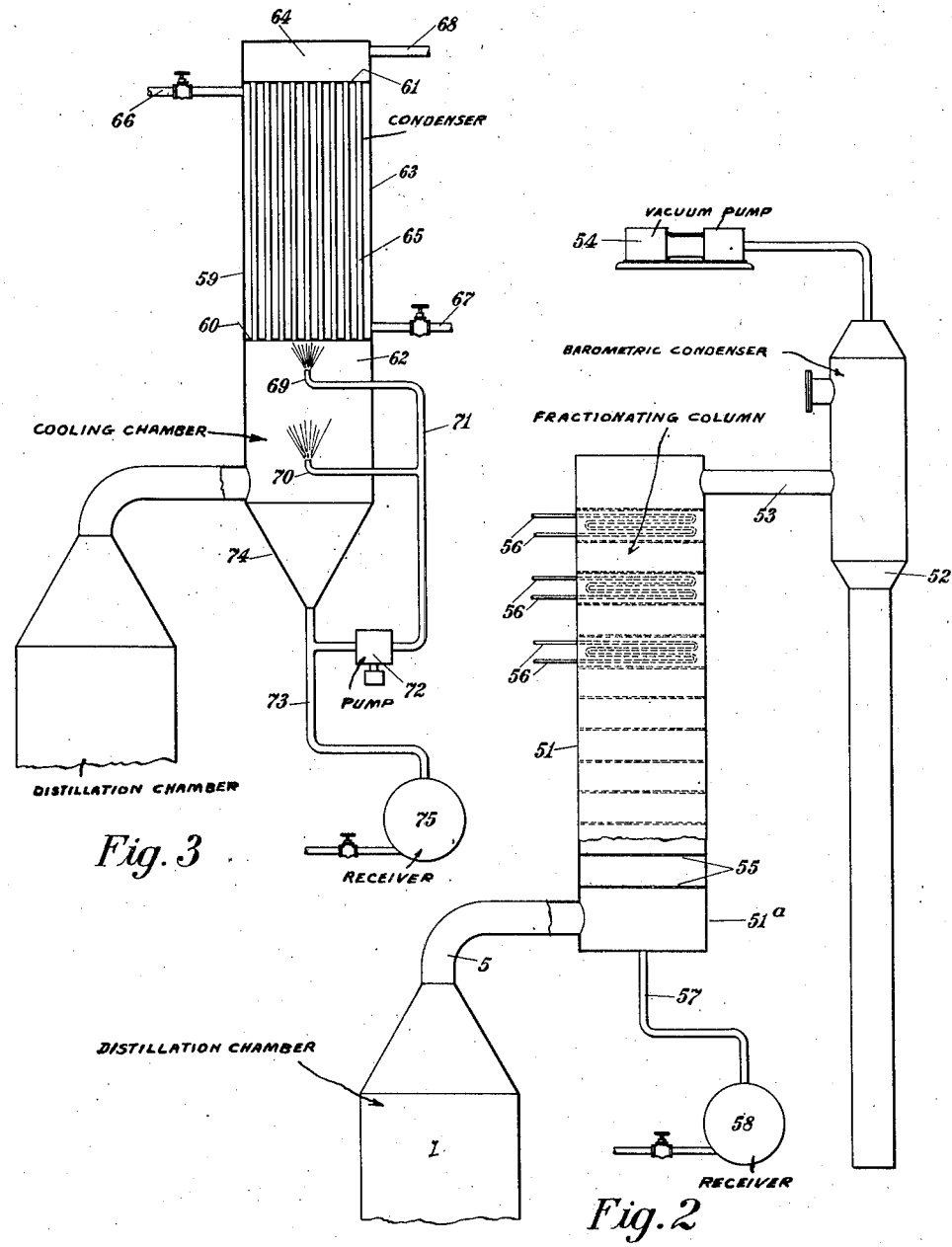

Patented May 3, 1927.

1,626,986

UNITED STATES PATENT OFFICE.

SAMUEL K. VARNES, OF WILMINGTON, DELAWARE, ASSIGNOR TO E. I. DU PONT DE NEMOURS & COMPANY, OF WILMINGTON, DELAWARE, A CORPORATION OF DELAWARE.

METHOD OF RECOVERING GLYCERIN FROM FERMENTED-MOLASSES MASH.

Application filed June 14, 1922. Serial No. 568,179.

This invention is in the art of producing glycerin by the fermentation of molasses. It relates more particularly to a method of recovering the glycerin from the fermented mash and yet more particularly to the removal, by distillation, of the glycerin from what may be termed the "concentrated slop" i. e. the mass obtained by the removal of alcohol from, and the concentration of, the fermented molasses mash.

It is possible to produce glycerin by the fermentation of molasses, especially black strap or cane molasses; it can be done by fermentation in the presence of salts or alkalies. But when the recovery of the glycerin so produced is attempted by the ordinary distillation methods great difficulties are encountered. Ordinary black strap molasses contains about 46% of sucrose and invert sugars which are fermentable and in addition has about 4% of non-fermentable ingredients which will reduce Fehling's solution, some 20% water and the rest gums, pectins, salts, and so forth. Usually from 25 to 30% of the actual sugars, sucrose and invert sugar present in the molasses are converted to glycerin and 35 to 45% to alcohol. The fermented mash or beer therefore has a concentration of about 3% glycerin, 6% alcohol and 7 to 8% gums and so forth. On distillation of the alcohol and concentration of the alcohol-free beer or "slop" a viscous liquid containing up to 15 to 20% glycerin, and also containing most of the salts added, is obtained. On distilling this material in the ordinary type kettle vacuum still only very indifferent yields of glycerin are obtained, varying from almost none to not higher than 50%, generally speaking, of the glycerin in the beer. Certain of the reasons for this low recovery are as follows:

Due to the large amount of gums and salts present the concentration of the glycerin is low and as the salts and gums are poor conductors of heat it takes a very long time to heat the mass to the proper distillation temperature. As the temperature is being brought up the mass becomes almost solid, being substantially like pitch in its physical properties. After part of the glycerin has distilled over the heat conductance is so low that the rest of the glycerin will not be distilled. Again, under the conditions produced during the distillation practically all the water is distilled out and the superheated steam used channels through the mass. These conditions are very favorable to the production of di-glycerin and acrolein, and in consequence a large portion of the glycerin is lost by decomposition.

A further difficulty is that since the mass in the still becomes almost solid it is washed out only with considerable difficulty. Also the method is not continuous and has to be carried out by the batch method. Thus, not only is the recovery of glycerin usually under 50% for reasons of which those mentioned above are examples but also due to operating difficulties the output per hour is very low.

In avoidance of the various difficulties certain methods have been developed which call for the precipitation of most of the gums and salts from the dilute slop whereby it has upon concentration, been possible to get a "clarified" concentrate containing up to 35%, or better, of glycerin, and this concentrate on distillation has given a glycerin recovery somewhat better than that mentioned above. But these "clarification" methods are expensive and complicated, rendering the devising of a less expensive and simpler method highly desirable. Now I have devised a method of recovering the glycerin from the fermented molasses mash or beer or, more exactly, from the concentrated slop, by which the various difficulties incident to the ordinary distillation methods and also the objectionable features of the clarification methods are avoided; yet highly satisfactory recoveries are obtained, recoveries of glycerin from the beer being practically quantitative, e. g. in tests analysis of the residue showed that 92–98% of the glycerin had been distilled out.

In accordance with the present invention as preferably practiced, no precipitation of the gums, salts, etc., is made, as in the clarification methods (such complications being avoided), and the thin liquid resulting from the fermentation is straightway freed from alcohol and concentrated to a relatively thick mass, i. e. the "viscous liquid" heretofore mentioned in discussing the prior methods involving ordinary distillation. Such mass contains, substantially 50–65% solids, 15 to 20% glycerin and the remainder water, a desirable concentration being such that the ratio of glycerin to water is approximately 20:15 (giving a boiling point of about 135° C.). This mass, in accordance with my discovery of the possibility and practicability thereof, is sprayed into a chamber or still under such conditions of pressure in the chamber and temperature and pressure of the mass as fed, that a portion of the water and glycerin of the mass bursts or flashes into vapor, exploding the viscous liquid steam into exceedingly fine mist. At the same time a hot gaseous carrier chemically inert at the temperatures involved, such as superheated steam, carbon dioxide, nitrogen, and flue gas free from oxygen, and preferably exemplified by a supply of superheated steam is introduced into the chamber to intimately mingle with the mist; whereupon the steam gives up heat to the suspended mist, vaporizing the water and glycerin content, which is conducted from the chamber and the glycerin recovered. Desirably the chamber is at atmospheric pressure while the mass is preheated to well above its boiling point at atmospheric pressure, and given a pressure sufficiently above atmospheric to prevent its boiling before discharging into the chamber; the steam is desirably supplied at atmospheric pressure and superheated to furnish desired heat. The vapors issuing from the still are desirably passed through a suitable system, as condensing means of any preferred type, to recover the glycerin; preferably, as hereafter more fully described, the system includes provisions for using the heated vapors from the distillation chamber to concentrate the condensed dilute glycerin. The solid residue collecting in the still descends to the bottom thereof and may be removed at intervals.

As will be understood by those skilled in the art, the fermented molasses mash is desirably distilled with steam in a beer still to remove alcohol, the alcohol-free liquid or slop evaporated in a triple effect evaporator, to remove water, and again evaporated in a finishing evaporator to remove additional water, thus giving the before mentioned viscous liquid or unclarified concentrated slop which cannot be satisfactorily treated to recover glycerin by the ordinary methods of distillation.

As to the concentration of the slop, it is for present purposes, preferably carried, as above indicated, to the point where the ratio of the glycerin to the water is approximately 20:15. At this concentration the boiling point of the mixture is sufficiently high to permit the called for superheating of the mixture to secure satisfactory atomization without the use of excessive pressure. To carry the concentration beyond this point necessitates the reconcentration of the distillate, due to appreciable quantities of glycerin being carried over with the water; while to operate with a concentrate of lower glycerin-water ratio will reduce the capacity of the spray distillation equipment because of the fact that it requires approximately twice as much heat to distill a pound of water as to distill a pound of glycerin. However, it is practical to work considerably beyond this ratio in either direction.

One object of the invention is to provide a method of the general character above indicated for recovering glycerin from fermented molasses mash, and, more particularly, from unclarified concentrated slop. To these ends, and also to improve generally upon methods and apparatus of the character indicated, the invention consists in the various matters described and claimed herein.

The better to describe the invention, reference is made to the apparatus illustrated in the accompanying drawings, it being understood that the invention is not restricted thereto.

Figure 1 is a conventional and somewhat diagrammatic elevational view, of an apparatus assembly desirable for the performance of the present method, and embodying the invention as it relates to apparatus, certain parts being broken out to show interiors; and Figures 2 and 3 are views of similar character of certain modifications.

In describing the invention in detail I shall first describe the apparatus illustrated in Figure 1, then its operation in the performance of the method, and then shall describe the modifications illustrated in Figures 2 and 3, and their operation. Referring to Figure 1, the illustrated apparatus presents, in general, a preferably cylindrical distillation chamber, still, or evaporator, 1, a desirably cylindrical temperature-reducing or spray-cooling chamber 2, an evaporator 3, and a condenser, preferably a barometric condenser, 4, the elements being connected as indicated by the pipes 5, 6 and 7. The conical lower end of the distillation chamber 1 is provided with a short open-ended tube 8, surrounded by a cylinder 9 which is extended to provide a residue chamber 10 which is provided at its hopper-like bottom 11 with a closure 12. The closure as shown is a cone bell 13 mounted on the counterweighted lever 14 fulcrumed at 15 to swing to and from closing position. At the lower end of the chamber 1 are introduced pipes 16 and 17 for supplying steam and slop respectively. Means, as an oil-burning heater, for superheating the steam as supplied from any suitable source (not shown) is indicated at 18. Slop is supplied to the pipe 17 from a suitable storage receptacle 19 provided with a steam heating coil 20, and is pumped, by the pump 21, through a heating device, as a gas heater 22 with coil 17ª. The pipe 17 is provided at its end with a spray nozzle 23 preferably of the pressure atomizing type. Desirably a filtering screen 24 is provided in the pipe 17 comprising any suitable screen, bridging the pipe, for removing more or less of any extraneous matter.

The temperature reducing chamber 2 is provided with an external circulating piping system, designated generally as 25 and including a plurality of pipes, as 26 and 27, extended within the chamber at points intermediate its length and provided with spray nozzles, as 26ª and 27ª. The pipes 26 and 27 are connected with a riser pipe 28 the lower end of which is connected with a pump 29 which receives liquid from the conical bottom 30 of the chamber 2, by the pipe 31. A pipe 32 connects the pipe 31 with a storage receptacle 33, and a pipe 34 connects the pipe 32 with the calandria 35 of the evaporator 3.

The evaporator 3 comprises the partitions 36 and 37 dividing the same into the chambers 38, 39 and 40, with the open-ended pipes 41 and central circulating pipe 41ª passing through the chamber 39 and connecting the chambers 38 and 40, the chamber 39 with the pipes 41 presenting, of course, the calandria 35 before mentioned. The pipe 6 and, as before noted, the pipe 34 communicate with the chamber 39. At its bottom the chamber 38 is provided with the pipe 42, valved at 43, connecting the chamber with the storage receptacle 44 for the recovered glycerin and is also provided with a pipe 45, valved at 45ª, connecting the chamber and the receptacle 33. A vent in chamber 39 for non-condensible gases is indicated at 46. The barometric condenser 4 is shown as provided with a water supply pipe 47, a tail pipe 48, and an outlet 49, for non-condensible gases. To the outlet pipe 49 is connected the vacuum pump 50.

In practicing the method of the present invention, with the aid of the described apparatus, the unclarified concentrated slop is taken from the storage tank 19, where it has been heated by the coil 20, and is delivered at high pressure, e. g., desirably between 250 and 350 pounds per square inch gauge, to the coil 17ª in heater 22 where it is heated to well above its boiling point at the (preferably atmospheric) pressure in chamber 1. As the slop leaves the nozzle 23 in chamber 1 a portion of the water and glycerin bursts into vapor, exploding the stream into a state of exceedingly fine mist. The ingoing slop temperature should preferably be substantially 210° C., a satisfactory working range being 190° to 220° C. and temperatures up to 230° C. being workable. If the temperature drops to 170° C. the superheat is insufficient and poor atomization results; if on the other hand the temperature rises to 240° C. an action similar to oil cracking may occur, causing deposits in the piping. It is highly advisable to maintain the pressure at the nozzle higher than the corresponding boiling point pressure of the liquid at the highest temperature likely to be reached. For example, with a slop temperature of 210° C., the liquid will boil at about 210 pounds per square inch gage; so a pressure of at least 225 pounds, is advisable for slop at temperatures up to 230° C. as, otherwise, partial distillation or flashing in the piping may occur resulting in deposits and clogging. The lower the temperature, of course the lower the pressure can be. It is preferable to operate at about 250 pounds nozzle pressure for the temperature range indicated above.

Simultaneously with the introduction of the slop, steam at atmospheric pressure and superheated by passage through the superheater 18 is introduced through the pipe 16, and passes up through the open ended tube 8 and intimately mingles with the finely misted slop, the two meeting at the top of the tube 8 or thereabouts. The steam gives up heat to the suspended mist, vaporizing the water and glycerin content which, together with the steam, leaves the chamber 1 through the pipe 5. A desirable temperature range for the steam is substantially 390° C. to 430° C., preferably substantially 410° C; if the temperature drops to 370° C. the residue is very stiff and pasty and carries a considerable quantity of glycerin undistilled, while if the temperature is allowed to go to 450° C. the residue becomes too dry and may clog the bottom or throat of the chamber 1, and also some decomposition of the glycerin results as well as decomposition of the organic matter of the residue which increases the volume of non-condensible gas to be disposed of.

As the volatile matters are leaving through the pipe 5, the non-volatile constituents drop to the bottom of the chamber 1, or flow down the sides, and pass through the tube 8 into the residue chamber 10 from which they are removed at intervals through the bottom opening of the chamber.

The volatile products leaving through the pipe 5, and comprising a dilute mixture of glycerin vapor in superheated steam and carrying a very small portion of entrained solid residue (less than 2% of the total solids sprayed into the chamber 1), pass into the spray cooling device 2 and are met by the liquid spray issuing from the nozzles 27ª, 26ª. A portion of this liquid vaporizes and reduces the temperature of the superheated entering-vapors substantially to saturation, at the same time scrubbing the vapors free of entrained residue. (The temperature in the spray-cooling device 2 may be about 105°–110° C.). The scrubbed vapors depart through the pipe 6 and, entering the chamber 39 of the evaporator 3, surround the pipes 41 (and 41ª). The weight of vapor, now substantially saturated, leaving the chamber 2 exceeds the weight of vapor entering by the amount of liquid evaporated from the liquid sprays. The vapors are condensed in the relatively cool chamber 39 while the non-condensible gases are vented through the pipe 46. The condensate, a dilute solution of glycerin in water, is removed through the pipe 34 and delivered to storage 33. The unvaporized portion of the sprayed liquid leaving the nozzles 26ª, 27ª is removed from the chamber 2 through the pipe 31 and is returned to the spray nozzles by the pump 29 delivering to the pipe 28. The quantity of liquid evaporated in circulation through this spray cooling-evaporating system is replaced by condensate flowing from pipe 34 through the pipe 32. From storage 33 the condensed glycerin-water mixture is delivered (the chamber 38 being under vacuum) through pipe 45 into the liquid reservoir or chamber 38 of the evaporator 3, the flow being controlled by the valve 45ª it being evident that operations may be started with the storage tank 33 initially filled, say from a previous operation, and the valve 45ª may be set to pass only excess liquid, thus keeping the tank 33 full. The liquid level in the evaporator is carried at such a height as to completely or partially fill the tubes 41 and 41ª. A vacuum, for example about 27 in. of mercury, is carried within the chamber 40, reducing the boiling temperature below the temperature of the vapors surrounding the tubes, and the liquid in the tubes is boiled by the heat given up by the condensation of the vapors. The steam produced is separated in steam space 40 from the remaining liquid and passes through pipe 7 to the condenser 4 where it is condensed and is discharged through the tail pipe 48. As before indicated, water is supplied to the condenser at 47 and non-condensible gases are drawn off, by the vacuum pump 50, through the pipe 49. The concentrated liquid passes down through the circulating pipe 41ª to the reservoir 38 and is recirculated through the tubes until it is sufficiently concentrated, whereupon it is withdrawn through the pipe 42 to the receiver 44, the flow being controlled by the valve 43.

Thus it will be seen that the present invention provides for the ready recovery of glycerin from fermented black strap molasses mash or beer and, more definitely, from the unclarified concentrated slop obtained by the removal of alcohol from the beer and by concentration of the alcohol-free liquid or slop without clarification of the slop. Thus black strap molasses can satisfactorily be used as the source of fermentable material, previous difficulties of glycerin recovery having been overcome. This is a particularly desirable result. As black strap molasses is the cheapest and one of the few materials which will allow of the production of fermentation glycerin which can compete with glycerin from oils, fats and so forth.

Referring now to the modified apparatus illustrated in Figures 2 and 3, and, first, to that shown in Figure 2, the apparatus there shown comprises a fractionating column, designated generally as 51, and a barometric condenser 52, the two being connected by the pipe 53, and the condenser being connected with a vacuum pump 54. It will be understood that the column is to be connected with a spray distillation chamber, as 1, provided, as previously described, with steam inlet, slop feed, and so on, the apparatus now in question taking the place of the various elements beyond the vapor pipe 5 as illustrated in Figure 1, and the vapor pipe 5 being connected with the base 51ª of the fractionating column 51 as indicated. The column comprises a plurality of perforated plates 55, and desirably, a plurality of cooling pipes 56 suitably arranged within the column and supplied with cooling medium, as water, from any suitable source. The pump 54 is operated to create a vacuum sufficient to draw the vapors through the column and the column is cooled by radiation from the shell, or if called for, by the cooling pipes 56, to hold the top of the column at the boiling point of water at the vacuum maintained at the top of the column. Under these conditions, in accordance with the usual operation of fractionating columns, there is withdrawn from the base thereof, by way of the pipe 57 leading to the receiver 58, a concentrated mixture of glycerin and water, while steam stripped free of glycerin is discharged through the pipe 53.

Referring to the arrangement shown in Figure 3 the same is, like that of Figure 2, for use with a spray distillation chamber, as 1, equipped as before indicated, and for substitution for the elements beyond the vapor pipe 5 in Figure 1. The illustrated structure comprises a shell 59 having the partitions 60 and 61 to divide the same into chambers 62, 63 and 64, the partitions carrying the open-ended pipes 65. Cooling medium, as water, is supplied to the chamber 63 by the pipe 66 and drawn off at 67. The upper chamber, 64, is furnished with an escape pipe 68. Spray nozzles in suitable number, as 69 and 70, are mounted in the chamber 62 and supplied with liquid pumped through the pipe 71, by the pump 72 taking its supply from the pipe 73. This pipe 73 is connected with the base 74 of the shell and drains into a receiver 75, it being evident that the illustrated draw-off valve from the receiver 75 may be set to discharge only excess condensate, thus keeping the receiver and circulating system full. In operation, the vapors are delivered from the chamber 1 to the spray cooling chamber 62 where the superheat is removed and the vapors scrubbed and cooled to substantially saturated condition by the partial evaporation of the liquid sprayed. The vapor is condensed in the pipes 65, surrounded by the cooling medium in the chamber 63, and the condensed mixture of glycerin and water drains down through the tubes 65, into the pipe 73, and so to the storage receiver 75. In the operation the cooling is maintained such that the temperature in the chamber 64 is held somewhat below 100° C. (the pipe 68 leading to atmosphere).

If desired, the operation and arrangements may be such that steam stripped of glycerin passing from the system shall be reused in the chamber 1, saving expense. For example, with the apparatus of Figure 2 condensation of the steam may be omitted and the steam piped to the superheater 18: correspondingly, the apparatus of Figure 3, may be so operated that the steam, instead of being condensed, passes on, and such steam be conveyed to the superheater 18.

While chambers, as 1, of various dimensions may be used, I have found a chamber having a cylindrical portion about 27 feet in length and about 5 feet in diameter satisfactory. As mentioned above, I prefer to work with atmospheric pressure in the chamber 1, since, among other advantages, it does not call for so large a chamber as would be required for working satisfactorily under vacuum.

I claim:

1. In the art of producing glycerin by the fermentation of molasses, the steps of dividing unclarified concentrated slop into minute portions, exploding the so-divided slop into mist in contact with a hot gaseous carrier chemically inert at the temperatures involved while maintaining a temperature to quickly vaporize the glycerin from the slop, and condensing the evolved glycerin vapors.

2. In the art of producing glycerin by the fermentation of molasses, the steps of spraying into a chamber at atmospheric pressure unclarified concentrated slop, previously heated under positive pressure sufficiently high to retain it in liquid state and at a temperature sufficiently higher than the boiling point at atmospheric pressure of the glycerin-water mixture present in the slop to cause explosion of the sprayed slop into mist upon release of said positive pressure, simultaneously spraying into the chamber steam superheated to a higher temperature than that of the slop, thus causing quick vaporization of the exploded slop, and condensing the evolved vapors.

3. In the art of producing glycerin by the fermentation of molasses, the steps of highly heating unclarified concentrated slop while applying a pressure thereto sufficient to prevent exploding of the slop prior to the introduction thereof into the hereinafter named chamber, spraying said slop, so heated and under pressure, into a chamber at a pressure sufficiently low to give a pressure drop sufficient to cause explosion of the sprayed slop into mist, and into contact with steam, with the slop and steam heated to maintain a temperature to quickly vaporize the glycerin from the mist, and condensing the evolved glycerin vapors.

4. In the art of producing glycerin by the fermentation of molasses, the steps of spraying unclarified concentrated slop at a temperature substantially between 190° to 230° C. and at a pressure of at least substantially 225 pounds per square inch, into a chamber at substantially atmospheric pressure, and into contact with superheated steam at substantially atmospheric pressure and at temperature substantially between 390° to 430° C., and condensing the evolved glycerin vapors.

5. In the art of producing glycerin by the fermentation of molasses, the steps of spraying unclarified concentrated slop at a temperature of substantially 210° C. and at a pressure of substantially 250 pounds per square inch into a chamber at substantially atmospheric pressure, and into contact with superheated steam at substantially atmospheric pressure and at a temperature of substantially 410° C., and condensing the evolved glycerin vapors.

6. In the art of producing glycerin by the fermentation of molasses, in that process which comprises dividing unclarified concentrated slop into minute portions, exploding the so-divided slop into mist in contact with a hot gaseous carrier while maintaining a temperature to quickly vaporize the glycerin and water from the slop:—the step of spraying, into the said glycerin and water vapors, a relatively cool liquid mixture of glycerin and water directly and intimately into said vapors to reduce them to substantially saturation temperature, and condensing the so-saturated vapors.

In testimony whereof I affix my signature.

SAMUEL K. VARNES.